(12) United States Patent
Koyama

(10) Patent No.: US 8,403,428 B2
(45) Date of Patent: Mar. 26, 2013

(54) CHECK VALVE AND BRAKE HYDRAULIC PRESSURE CONTROL DEVICE USING THE SAME

(75) Inventor: Fumitoshi Koyama, Kariya (JP)

(73) Assignee: Advics Co., Ltd., Kariya, Aichi-pref. (JP)

( * ) Notice: Subject to any disclaimer, the term of this patent is extended or adjusted under 35 U.S.C. 154(b) by 295 days.

(21) Appl. No.: 12/817,426

(22) Filed: Jun. 17, 2010

(65) Prior Publication Data

US 2010/0327652 A1 Dec. 30, 2010

(30) Foreign Application Priority Data

Jun. 25, 2009 (JP) ................................. 2009-150837

(51) Int. Cl.
*B60T 17/00* (2006.01)

(52) U.S. Cl. ............ 303/1; 303/901; 137/535; 137/539; 251/337; 267/161

(58) Field of Classification Search ........... 303/1, 115.4, 303/115.1, 901; 188/282.5, 282.7; 267/161; 137/535, 539; 251/337
See application file for complete search history.

(56) References Cited

U.S. PATENT DOCUMENTS

| | | | | |
|---|---|---|---|---|
| 2,401,856 A | * | 6/1946 | Brock | 411/517 |
| 3,302,662 A | * | 2/1967 | Webb | 137/539 |
| 3,768,509 A | * | 10/1973 | Goda | 137/539 |
| 4,155,374 A | * | 5/1979 | Diehl | 137/519.5 |
| 4,176,682 A | * | 12/1979 | Diehl | 137/533.11 |
| 4,646,783 A | * | 3/1987 | Bazan et al. | 137/533.11 |
| 4,821,954 A | * | 4/1989 | Bowder | 236/48 R |
| 5,232,273 A | | 8/1993 | Eckstein et al. | |
| 5,794,656 A | * | 8/1998 | Breslin | 137/533.11 |
| 6,622,751 B1 | * | 9/2003 | Beck et al. | 137/315.33 |
| 6,910,745 B2 | | 6/2005 | Inage et al. | |
| 7,434,596 B2 | * | 10/2008 | Hohmann | 137/533.19 |
| 2008/0029165 A1 | * | 2/2008 | Beck | 137/539 |
| 2008/0029939 A1 | * | 2/2008 | Beck et al. | 267/64.17 |

FOREIGN PATENT DOCUMENTS

| | | | |
|---|---|---|---|
| DE | 3233268 A1 | * | 3/1984 |
| JP | 5-87043 A | | 4/1993 |
| JP | 2004-19805 A | | 1/2004 |

* cited by examiner

*Primary Examiner* — Robert A Siconolfi
*Assistant Examiner* — Mariano Sy
(74) *Attorney, Agent, or Firm* — Buchanan Ingersoll & Rooney PC

(57) ABSTRACT

A check valve having a spherical valve body received in a valve chamber, a valve seat for blocking the flow of fluid from the valve chamber toward an inflow port when having the spherical valve body seated thereon, and a plate-like resilient member arranged across the valve chamber. The resilient member has an annular fixed portion fixed on a circumferential wall of the valve chamber and a tongue piece portion radially extending from a radial one side of the annular fixed portion to extend an end thereof beyond an inner edge on a radial other side of the annular fixed portion. The tongue piece portion is formed to be deflected toward the valve seat side from the fixed portion and is resiliently contacted with the spherical valve body at a center part thereof for disengageably pressing the spherical valve body against the valve seat.

10 Claims, 4 Drawing Sheets

US 8,403,428 B2

CHECK VALVE AND BRAKE HYDRAULIC PRESSURE CONTROL DEVICE USING THE SAME

INCORPORATION BY REFERENCE

This application is based on and claims priority under 35 U.S.C. 119 with respect to Japanese Application No. 2009-150837 filed on Jun. 25, 2009, the entire content of which is incorporated herein by reference.

BACKGROUND OF THE INVENTION

1. Field of the Invention

The present invention relates to a check valve for allowing the flow of fluid in one direction only and also relates to a brake hydraulic pressure control device incorporating the check valve.

2. Discussion of the Related Art

Heretofore, in check valves that a ball is selectively seated on a valve seat surface for opening and closing a fluid passage, the ball (valve member) is urged by a coil spring (resilient member) toward the valve seat surface (i.e., in the valve closing direction). When the pressure on an upstream side of the valve seat surface increases a predetermined pressure or higher beyond the pressure on a downstream side of the valve seat surface, the ball leaves the valve seat surface against the resilient force of the coil spring to open the valve, so that fluid flows in a predetermined one direction. During the opening of the valve, a force caused by the flow of fluid and the resilient force of the coil spring are exerted on the ball, and thus, the ball is moved to a position where both of the forces are in balance.

For example, in a check valve disclosed in U.S. Pat. No. 6,910,745 B2 (equivalent of JP2004-19805 A), as shown in FIG. 3 of the patent, a compression coil spring 560 is used as resilient member, and a ball-like valve member 540 is urged by the compression coil spring 560 to be seated on the valve seat surface 504. The compression coil spring 560 is arranged so that the direction in which the compression coil spring 560 urges the valve member 540 is inclined at a predetermined angle relative to the direction in which the valve member 540 receives the pressure of fluid. Thus, at the time of a valve opening that the valve member 540 leaves the valve seat surface 504, the valve member 540 is pressed by the compression coil spring 560 which is arranged to be inclined, against a side wall surface 526, so that vibration such as resonance can be suppressed.

Further, in a check valve (outlet valve 17) disclosed in U.S. Pat. No. 5,232,273 (equivalent of JP 5-87043 A), as shown in FIG. 1 of the patent, a plate spring is used as resilient member for the purpose of reducing the height of the check valve. A sphere 50 being a ball-like valve member is urged by two plate or leaf spring tongue portions 57 toward a valve seat 51. The plate spring has a ring-like circumference, and the two leaf spring tongue portions 57 are formed to extend respectively from radially opposite positions of a ring internal portion toward the ring center and are in contact with the sphere 50 to urge the same.

However, in the prior art check valve disclosed in the first mentioned patent, there arise a problem that the use of the compression coil spring 560 results in a large space required for installation as well as a high cost.

Further, in the prior art check valve disclosed in the second mentioned patent, the sphere 50 as valve member is urged by the two leaf spring tongue portions 57 of a spring body 55 in a valve closing direction from one side only. At the time of a valve opening, since the two leaf spring tongue portions 57 equally urge the sphere 50 in the axial direction, it may be the case that when the sphere 50 leaves the valve seat 51 and is balanced by the pressure of fluid, the sphere 50 is brought into an unstable floating state and vibrates due to the pulsation or the like in the fluid discharged from a pump. Further, although the two leaf spring tongue portions 57 of the spring body 55 are flexed in the valve opening direction by being pushed by the sphere 50, the known check valve is not provided with any stop portions which limit the flex movements of the leaf spring tongue portions 57. Thus, there arises an anxiety that the leaf spring tongue portions 57 are strained over the allowable stress thereof to be destroyed.

SUMMARY OF THE INVENTION

Accordingly, it is a primary object of the present invention to provide an improved check valve which is not affected by the pulsation in a pump discharge pressure and which is reduced in cost and dimension.

Briefly, according to the present invention, there is provided an improved check valve which comprises a main body with a valve chamber formed therein between inflow and outflow ports thereof; a spherical valve body received in the valve chamber; a valve seat for blocking the flow of working fluid from the valve chamber toward the inflow port when the spherical valve body is seated on the valve seat; and a plate-like resilient member arranged across the valve chamber and urging the spherical valve body to be seated on the valve seat. The plate-like resilient member is provided with an annular fixed portion fixed on a circumferential wall of the valve chamber and a tongue piece portion extending from an inner edge on a radial one side of the annular fixed portion across the valve chamber to extend an end thereof beyond an inner edge on a radial other side of the annular fixed portion. The tongue piece portion is formed to be deflected from the annular fixed portion toward the valve seat side and is resiliently contacted with the spherical valve body at a center part thereof for disengageably pressing the spherical valve body against the valve seat.

With this construction, since the resilient member is formed to take a plate-like shape extending across the valve chamber and is provided with the annular fixed portion and the tongue piece portion extending radially from the annular fixed portion, the check valve can substantially be shortened in the direction of fluid flow. Further, since the tongue piece portion is formed to extend the end thereof beyond the inner edge on the radial other side of the annular fixed portion in the radial direction, the tongue piece portion cannot move across the annular fixed portion from the valve chamber side. The end of the tongue piece portion is prevented from being moved or flexed across the annular fixed portion in the direction away from the valve seat, and the tongue piece portion is held in the state that it is always inclined relative to the direction of fluid flow. Thus, when leaving from the valve seat and being balanced by the pressure of the working fluid, the spherical valve body urged by the tongue piece portion is deflected in one direction inclined relative to the axial direction of the valve chamber and therefore, can be held stably. Accordingly, it does not occur that the spherical valve body vibrates by being influenced by the pulsation in the working fluid, and nor does it that the spherical valve body hits the circumferential wall of the valve chamber or the valve seat to generate strange sounds. Further, since the tongue piece portion cannot move across the inner edge on the radial other side of the annular fixed portion in the direction away from the valve seat, it does also not occur that the tongue piece portion is broken as a result of being strained over an allowable stress thereof.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS (First Embodiment)

Figure 1:
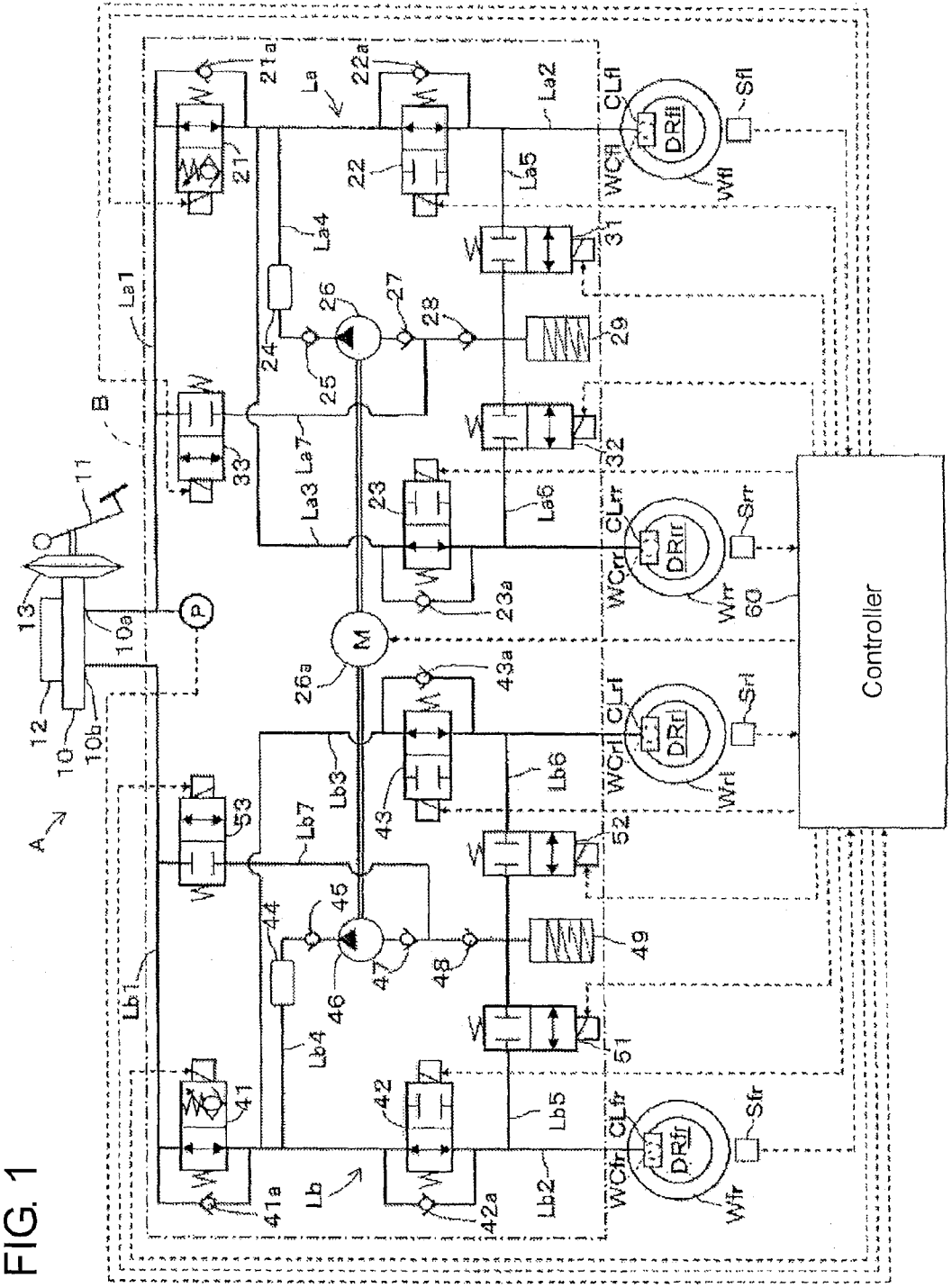
FIG. 1 is a schematic circuit diagram of a brake hydraulic pressure control device in embodiments according to the present invention.

Hereafter, a brake hydraulic pressure control device A used in each of first and second embodiments according to the present invention will be described with reference to FIG. 1. FIG. 1 is a schematic circuit diagram of the brake hydraulic pressure control device A. The brake hydraulic pressure control device A is provided with a master cylinder 10 for generating pressurized brake fluid as working fluid of the fluid pressure depending on the stepping state of a brake pedal 11 and for supplying the pressurized brake fluid to wheel cylinders WCfl, WCrr, WCrl, WCfr which restrict the rotations of respective wheels (i.e., road wheels) Wfl, Wrr, Wrl, Wfr, a reservoir tank 12 storing brake fluid for replenishing the same to the master cylinder 10, and a vacuum booster 13 for boosting the stepping force applied to the brake pedal 11. The brake hydraulic pressure control device A is also provided with wheel speed sensors Sfl, Srr, Srl, Sfr for detecting the wheel speeds of the wheels Wfl, Wrr, Wrl, Wfr, an actuator B including various components surrounded by one-dot-chain line in FIG. 1 and being capable of independently supplying controlled fluid pressures to the wheel cylinders WCfl, WCrr, WCrl, WCfr regardless of the stepping state of the brake pedal 11, and a controller 60 for controlling the actuator B. In this first embodiment, the brake hydraulic pressure control device A is used in a front-wheel drive vehicle.

The respective wheel cylinders WCfl, WCrr, WCrl, WCfr are provided in respective calipers CLfl, CLrr, CLrl, CLfr and receive fluid-tightly slidable pistons (not shown) therein. When the pressurized fluid from the master cylinder 10 is supplied to the respective wheel cylinders WCfl, WCrr, WCrl, WCfr, the respective pistons push respective pairs of brake pads (not shown), whereby the pairs of brake pads pinch disc rotors DRfl, DRrr, DRrl, DRfr rotating together with the respective wheels Wfl, Wrr, Wrl, Wfr to stop the rotations of the same. Although the present embodiment uses disc brakes, there may be used drum brakes. In this modified form, when the pressurized fluid is supplied to the respective wheel cylinders WCfl, WCrr, WCrl, WCfr, the respective pistons push respective pairs of brake shoes, whereby the same are pressed against the internal surfaces of brake drums rotating together with the respective wheels Wfl, Wrr, Wrl, Wfr to stop the rotations of the same.

The brake hydraulic pressure control device A in the first embodiment has a brake piping system constituted in an X-piping fashion, and first and second output ports 10a, 10b of the master cylinder 10 are respectively connected to first and second piping systems La, Lb. The first piping system La is for bringing the master cylinder 10 into communication with the wheel cylinders WCfl, WCrr of the left front wheel Wfl and the right rear wheel Wrr, while the second piping system Lb is for brining the master cylinder 10 into communication with the wheel cylinders WCrl, WCfr of the left rear wheel Wrl and the right front wheel Wfr.

The first piping system La is composed of first to seventh oil passages La1-La7. The first oil passage La1 is connected to the first output port 10a of the master cylinder 10 at its one end. The second oil passage La2 is connected to the first oil passage La1 at its one end and to the wheel cylinder WCfl at the other end thereof. The second oil passage La2 has a cutoff valve 21 and a retention valve 22 arranged in series in turn from the master cylinder 10 side. The third oil passage La3 is connected at one end thereof between the cutoff valve 21 and the retention valve 22 on the second oil passage La2 and is connected at the other end thereof to the wheel cylinder WCrr. A retention valve 23 is arranged on the third oil passage La3. The fourth oil passage La4 is connected at one end thereof between the cutoff valve 21 and the retention valve 22 on the second oil passage La2 and is connected to a built-in reservoir tank 29 at the other end thereof. The fourth oil passage La4 has a damper device 24, a check valve 25 according to the present invention, a pump 26, a check valve 27 and a check valve 28 arranged in turn from the second oil passage La2 side. The fifth oil passage La5 is connected at one end thereof between the retention valve 22 on the second oil passage La2 and the wheel cylinder WCfl and is connected at the other end thereof between the check valve 28 on the fourth oil passage La4 and the built-in reservoir tank 29. A reducing valve 31 is arranged on the fifth oil passage La5. The sixth oil passage La6 is connected at one end thereof between the retention valve 23 on the third oil passage La3 and the wheel cylinder WCrr and is connected at the other end thereof between the check valve 28 on the fourth oil passage La4 and the built-in reservoir tank 29. A reducing valve 32 is arranged on the sixth oil passage La6. The seventh oil passage La7 is connected to the first oil passage La1 at one end thereof and is connected at the other end thereof between the check valve 27 and the check valve 28 on the fourth oil passage La4. A replenishing valve 33 is arranged on the seventh oil passage La7.

The cutoff valve 21 is a normally open electromagnetic shutoff valve for selectively bringing the master cylinder 10 into communication with, or blocking from, the wheel cylinders WCfl, WCrr. The cutoff valve 21 is normally held in a communication state (the state shown in the figure), but, when in a blocking state, is able to hold the pressure on the wheel cylinders WCfl, WCrr side higher by a regulatable pressure difference than the pressure on the master cylinder 10 side. This pressure difference is regulatable in dependence on a control current supplied from the controller 60. The cutoff valve 21 is constituted as a two-position valve which is controllable to the communication state (the state shown in the figure) when deenergized in response to a command from the controller 60 but to the blocking state when energized. A check valve 21*a* for allowing the flow from the master cylinder 10 to the wheel cylinders WCfl, WCrr is provided in parallel with the cutoff valve 21.

The retention valve 22 is a normally open electromagnetic shutoff valve for selectively bringing the master cylinder 10 into communication with, or blocking from, the wheel cylinder WCfl. The retention valve 23 is a normally open electromagnetic shutoff valve for selectively bringing the master cylinder 10 into communication with, or blocking from, the wheel cylinder WCrr. Each of the retention valves 22 and 23 is constituted as a two-position valve which is controllable to the communication state (the state shown in the figure) when deenergized in response to a command from the controller 60 but to the blocking state when energized. Check valves 22*a*, 23*a* for respectively allowing the flows from the wheel cylinders WCfl, WCrr toward the master cylinder 10 are provided respectively in parallel to the retention valves 22, 23.

The pump 26 is drivable by an electric motor 26*a* the operation of which is controllable in response to a command from the controller 60. At the time of a pressure reducing mode in an ABS control, the pump 26 is brought into communication at its suction port with the built-in reservoir tank 29 storing brake fluid therein and into communication at its discharge port with the master cylinder 10 and the wheel cylinder WCfl, WCrr through the check valve 25 and the damper device 24. The pump 26 draws the brake fluids in the wheel cylinders WCfl, WCrr or the brake fluid stored in the built-in reservoir tank 29 and returns the drawn brake fluid to the master cylinder 10. At the time of a traction control, because the replenishing valve 33 is brought into communication, the pump 26 is brought into communication at its suction port with the reservoir tank 12 storing brake fluid therein and into communication at its discharge port with the wheel cylinders WCfl, WCrr through the check valve 25 and the damper device 24. The pump 26 is operable to draw the brake fluid stored in the reservoir tank 12 and send the pressurized brake fluid to the wheel cylinders WCfl, WCrr. The pump 26 is a rotary pump, specifically an internal gear rotary pump such as trochoid gear pump. A pulsation component is included in the pressure of the brake fluid discharged from the pump 26.

The check valve 25 is for blocking the flow (i.e., backflow) of brake fluid toward the discharge port of the pump 26. The check valve 27 is for blocking the backflow of brake fluid from the pump 26. The check valve 28 is for blocking the flow of brake fluid from the master cylinder 10 toward the built-in reservoir tank 29 at the time of a traction control.

The reducing valve 31 is a normally closed electromagnetic shutoff valve for selectively bringing the wheel cylinder WCfl into communication with, or blocking from, the built-in reservoir tank 29. The reducing valve 32 is a normally closed electromagnetic shutoff valve for selectively bringing the wheel cylinder WCrr into communication with, or blocking from, the built-in reservoir tank 29. Each of the reducing valves 31, 32 is constituted as a two-position valve which is controllable to a blocking state (the state shown in the figure) when deenergized in response to a command from the controller 60 and to a communication state when energized.

The second piping system Lb takes the same construction as the aforementioned first piping system La and is composed of first to seventh oil passages Lb1-Lb7, a cutoff valve 41, retention valves 42, 43, a damper device 44, a check valve 45 according to the present invention, a pump 46, a check valve 47, a check valve 48, a built-in reservoir tank 49, reducing valves 51, 52 and a replenishing valve 53. Description regarding these components will be omitted because their constructions and functions are apparent from the foregoing description of those composing the first piping system La.

The wheel speed sensors Sfl, Srr, Srl, Sfr are respectively provided in the vicinities of the respective wheels Wfl, Wrr, Wrl, Wfr and output to the controller 60 pulse signals whose frequencies correspond to the rotational speeds of the respective wheels Wfl, Wrr, Wrl, Wfr.

The first oil passage La1 in the first piping system La is provided with a pressure sensor P connected thereto for detecting a master cylinder pressure being the brake fluid pressure in the master cylinder 10, and the detection signal therefrom is transmitted to the controller 60. In a modified form, the pressure sensor P may be provided to be connected to the first oil passage Lb1 in the second piping system Lb.

Further, the brake hydraulic pressure control device A is provided with the controller 60 connected to the pressure sensor P, the electric motor 26*a*, the respective electromagnetic valves 21, 22, 23, 31, 32, 33, 41, 42, 43, 51, 52, 53 and the respective wheel speed sensors Sfl, Srr, Srl, Sfr all of which have been aforementioned. The controller 60 performs an ABS control (antilock brake control), a traction control and the like based on inputs thereto from the respective wheel speed sensors Sfl, Srr, Srl, Sfr and the pressure sensor P.

Figure 2:
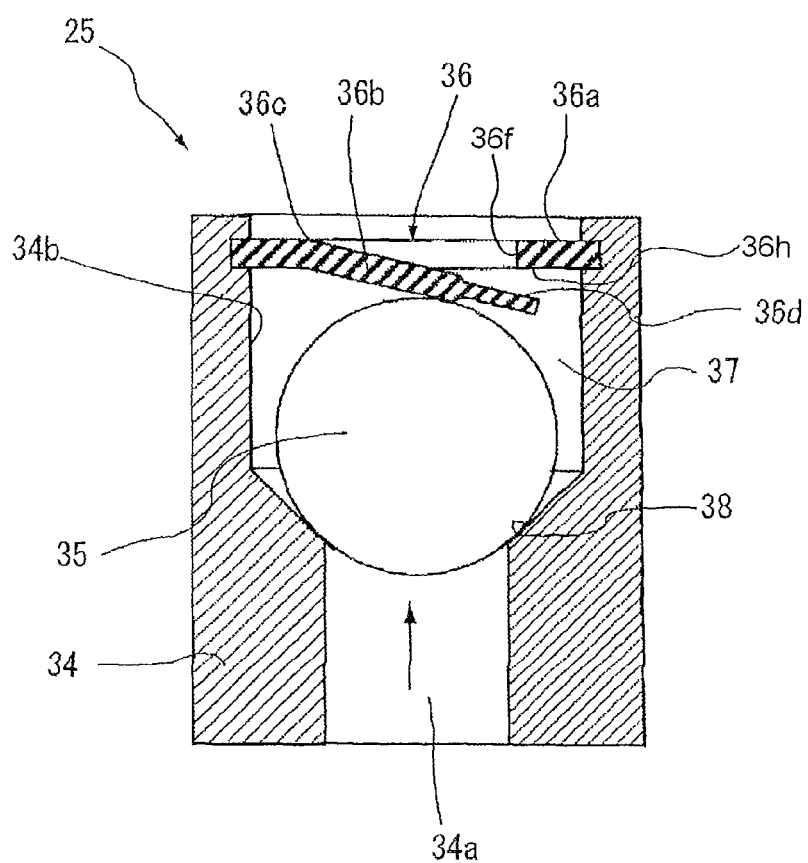
FIG. 2 is a sectional view in a closed state of a check valve in a first embodiment.
Figure 3:
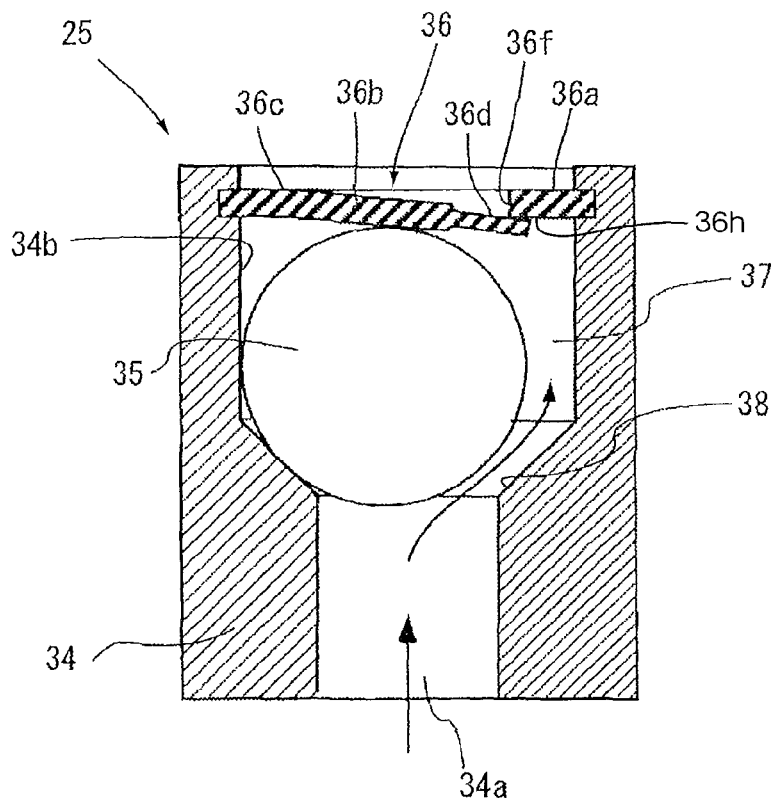
FIG. 3 is a sectional view in an open state of the check valve in the first embodiment.
Figure 4:
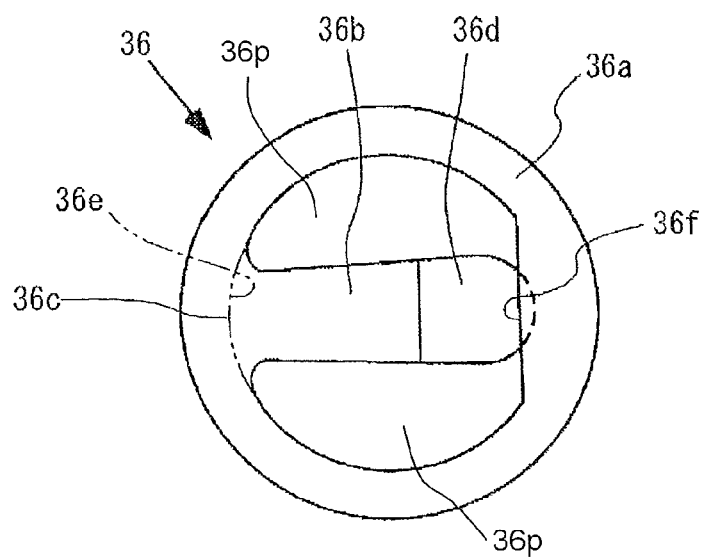
FIG. 4 is a plan view of a plate spring incorporated in the check valve in the first embodiment.

Next, description will be made regarding the check valves 25, 45 arranged on the discharge sides of the pumps 26, 46 in the first embodiment according to the present invention. The check valves 25, 45 are the same in construction and function, and the following description will be directed to the check valve 25 only. FIG. 2 is a sectional view of the check valve 25 in the closed state, whereas FIG. 3 is a sectional view of the check valve 25 in the open state. FIG. 4 is a plan view showing the shape of a plate spring 36 as a resilient member used in the check valve 25. In the following description, the pump 26 side as viewed in FIG. 1 of the check valve 25 is defined as an upstream side, whereas a discharge port (not shown) side being the opposite side to the pump 26 side is defined as a downstream side.

As shown in FIG. 1, the check valve 25 is arranged on the downstream side of the pump 26. The check valve 25 is for permitting the flow in one direction of brake fluid discharged from the pump 26, but for blocking the backflow in the opposite direction toward the pump 26.

As shown in FIG. 2, the check valve 25 is composed of a main body 34, a spherical valve body 35, a valve seat 38 and a leaf or plate spring 36 urging the spherical valve body 35 in a direction to seat the same on the valve seat 38.

The main body 34 takes a cylindrical shape, for example, in the external form and is secured so that a suitable means keeps a fluid tightness between the external portion of the main body 34 and an ABS actuator casing (not shown). The main body 34 is provided with an inflow port 34*a* into which the brake fluid discharged from the pump 26 flows, the valve seat 38 which is formed to continuously expand from the inflow port 34*a* to take a taper shape, and a circumferential wall 34*b* being cylindrical in the cross-section perpendicular to the flow direction of brake fluid and extending from an expanded end of the valve seat 38 in parallel to the flow direction. A valve chamber 37 is defined by a space which is surrounded by the valve seat 38 and the circumferential wall 34*b*. That is, the valve chamber 37 is formed between the inflow port 34*a* and an outflow port.

The spherical valve body 35 is received in the valve chamber 37. The spherical valve body 35 is a metal-made sphere, for example, and has a function of blocking the flow of brake fluid when the spherical valve body 35 is seated on the valve seat 38. The diameter of the spherical valve body 35 is set to be a little smaller than the inside diameter of the circumferential wall 34b of the valve chamber 37. Thus, the spherical valve body 35 is freely movable inside of the circumferential wall 34b.

The plate spring 36 as resilient member is arranged on the downstream side of the spherical valve body 35. As shown in FIGS. 2 and 4, the plate spring 36 bodily has an annular fixed portion 36a fixed on the circumferential wall 34b of the valve chamber 37 with its surface (i.e., lower surface) perpendicular to the flow direction of the brake fluid and a tongue piece portion 36b bodily connected to the fixed portion 36a. The plate spring 36 has resiliency and is made of a material excellent at extensibility such as, for example, aluminum, copper or iron-base material. In order to form the plate spring 36, a material excellent at expansibility or extensibility may be provided with resiliency through a heat treatment after a rolled portion referred to later is formed thereon.

The tongue piece portion 36b is formed with its base end 36c connected bodily to an inner edge 36e (refer to FIG. 4) on a radial one side of the fixed portion 36a (in other words, the tongue piece portion 36b bodily extends from the inner edge 36e on the radial one side of the fixed portion 36a) and is bent or deflected downward (i.e., toward the valve seat 38) at a predetermined angle from the base end 36c acting as a fulcrum. The tongue piece portion 36b is kept in resilient contact with the spherical valve body 35 at an approximately middle or center portion in the direction in which the tongue piece portion 36b extends, and urges the spherical valve body 35 to be separably or disengageably pressed against the valve seat 38. Since the tongue piece portion 36b is formed to be deflected toward the valve seat 38 side with the fulcrum at around the base end 36c, the spherical valve body 35 which the tongue piece portion 36b contacts at the approximately center portion thereof is urged in a direction which is inclined at a predetermined angle with respect to the flow direction of brake fluid. That is, the spherical valve body 35 is in contact with a flat lower surface of the deflected tongue piece portion 36b not at the top of the sphere but at a spherical part off the top, and therefore, an imaginary line passing through the contact point and the center of the sphere is inclined a little relative to the axis of the circumferential wall 34b of the valve chamber 37 and hence, the flow direction of the fluid. Although the direction in which the tongue piece portion 36b urges the spherical valve body 35 differs a little bit in dependence on the bent or deflection amount of the tongue piece portion 36b toward the valve seat 38 side, the spherical valve body 35 is always urged to be inclined in the direction that comes close to the base end 36c of the tongue piece portion 36b (i.e., toward a part on the radial one side of the circumferential wall 34b of the valve chamber 37), relative to the flow direction of brake fluid.

Figure 5:
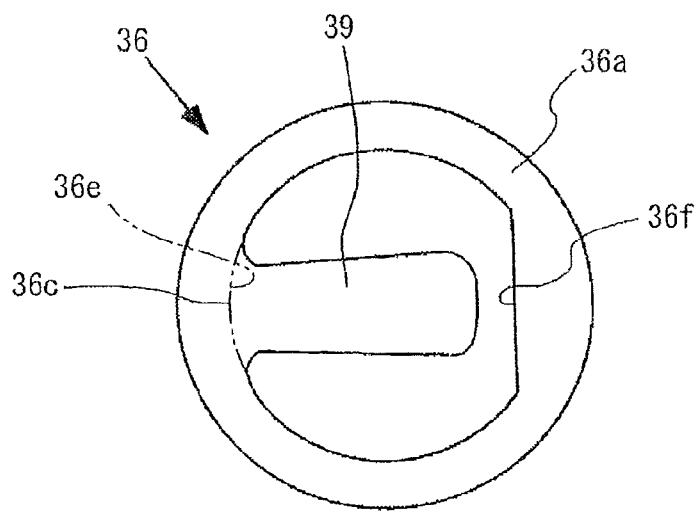
FIG. 5 is a plan view of a blank for the plate spring shown in FIG. 4.

Further, the tongue piece portion 36b is provided with a rolled portion 36d which has been rolled to have a length that extends an end thereof (Le., the extreme or free end of the tongue piece portion 36b in a cantilever fashion) beyond the inner edge 36f on a radial other side of the annular fixed portion 36a. In the first embodiment, the end of the tongue piece portion 36b is rolled to form the rolled portion 36d, wherein the tongue piece portion 36b radially transverses the valve chamber 37 to extend the rolled portion 36d beyond the inner edge 36f on the radial other side of the fixed portion 36a and hence, to place the rolled portion 36d under the fixed portion 36a on the radial other side. That is, from a one-piece blank shown in FIG. 5, the plate spring 36 is formed to have the tongue piece portion 36b by rolling an extreme or free end of a blank tongue portion 39 to extend to a position which is beyond the inner edge 36f on the radial other side of the fixed portion 36a. The tongue piece portion 36b formed in this way is arranged on the side closer to the valve seat 38 side than the annular fixed portion 36a and hence, is unable to move beyond the fixed portion 36a to a side opposite to the valve seat 38 side. Thus, when the tongue piece portion 36b is moved or flexed against the resilient force thereof, a downstream-side surface (i.e., upper surface as viewed in FIGS. 2 and 3) of the rolled portion 36d of the tongue piece portion 36b comes into engagement with an upstream-side end surface adjacent to the inner edge 36f on the radial other side of the fixed portion 36, so that a stop portion 36h is constituted by the upstream-side end surface adjacent to the inner edge 36f on the radial other side of the fixed portion 36. Because of being formed by being rolled in this way, the rolled portion 36d is made to be thinner in thickness than the neighborhood of the base end 36c of the tongue piece portion 36b and the fixed portion 36d.

Figure 7:
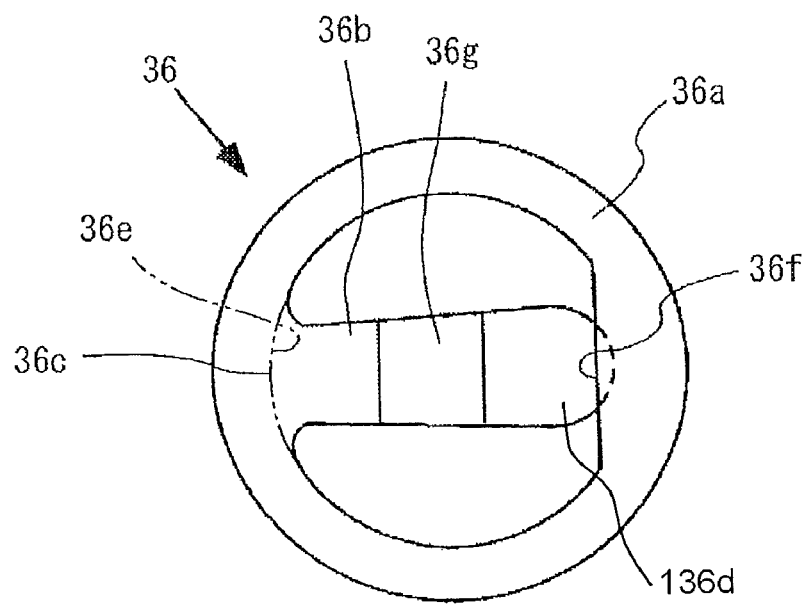
FIG. 7 is a plan view of a modified plate spring with a rolled portion formed at a different place.

The rolled portion 36d is not limited to being formed at the end of the tongue piece portion 36b as exemplified in the first embodiment. In a modified form, as shown in FIG. 7 for example, a center portion only of the tongue piece portion 36b may be rolled to form a rolled portion 36g and to extend an unrolled end 136d beyond the inner edge 36f on the radial other side of the fixed portion 36a. In a further modified form, the neighborhood of the base end 36c of the tongue piece portion 36b may be rolled to form a rolled portion and to extend an unrolled end beyond the inner edge 36f on the radial other side of the fixed portion 36a. In this way, a portion of the tongue piece portion 36b may be rolled to extend the end of the tongue piece portion 36b beyond the inner edge 36f on the radial other side of the fixed portion 36a. Moreover, the whole of the tongue piece portion 36b may be rolled to be formed as a rolled portion. In either of these forms, substantially the same effect can be attained. In addition, the portion such as the rolled portion 36d, 36g or the like of the tongue piece portion 36b may be extended not by rolling but by any other measures. Therefore, it is required for the tongue piece portion 36b to radially extend its end beyond the inner edge 36f on the radial other side of the fixed portion 36a. As best shown in FIG. 4, two fluid-pass openings 36p each taking a generally crescent shape with the same pass area are defined by lengthwise side edges of the tongue piece portion 36b and the inner edge of the annular fixed portion 36a for allowing the working fluid to flow across the plate spring 36.

Next, description will be made regarding the operation in the antilock brake control (ABS control) of the brake hydraulic pressure control device A in the first embodiment constructed above. At the time of a braking operation of the vehicle, the controller 60 judges whether or not, a slip amount caused by the braking operation (hereafter referred to as braking slip amount) of each of the wheels Wfl, Wrr, Wrl, Wfr is likely to become excess, based on output signals from the respective wheel speed sensors Sfl, Srr, Srl, Sfr. For example, if the braking slip amount of the wheel Wfl is likely to become excess, the controller 60 switches the retention valve 22 from the open position in the usual state to the closed position, also switches the reducing valve 31 from the closed position in the usual state to the open position and at the same time, starts the electric motor 26a. Thus, the brake fluid in the wheel cylinder WCfl is drained to the built-in reservoir tank 29 through the reducing valve 31. The fluid pressure in the wheel cylinder WCfl is reduced to weaken the force by which the brake pads operated by the wheel cylinder WCfl are pressed against the disc rotor DRfl, whereby the braking slip amount of the left front wheel Wfl is decreased.

The brake fluid drained from the wheel cylinder WCfl to the built-in reservoir tank 29 through the reducing valve 31 is returned to the communication passages between the cutoff valve 24 and the retention valves 22, 23 through the check valve 25 according to the present invention and the dumper device 24 as a result that the pump 26 is driven by the electric motor 26a, and is further returned to the master cylinder 10 through the cutoff valve 21.

When the braking slip amount of the left front wheel Wfl is sufficiently decreased, the, controller 60 switches the reducing valve 31 from the open position to the closed position and also switches the retention valve 22 from the closed position to the open position. Thus, the brake fluid from the master cylinder 10 is supplied to the wheel cylinder WCfl, and the fluid pressure in the wheel cylinder WCfl is again increased to increase the brake torque applied to the left front wheel Wfl, whereby the braking slip amount of the left front wheel Wfl is increased. Then, when the braking slip amount of the left front wheel Wfl comes close to the excess braking slip amount, the controller 60 switches the retention valve 22 from the open position to the closed position to hold the fluid pressure in the wheel cylinder WCfl.

In the state that the fluid pressure in the wheel cylinder WCfl is held, when the braking slip amount of the left front wheel Wfl further increases and again becomes likely to reach the excess slip amount, the controller 60 switches the retention valve 22 from the open position to the closed position and also switches the reducing valve 31 from the closed position to the open position. As a result, the brake fluid in the wheel cylinder WCfl is drained again to the built-in reservoir tank 29 through the reducing valve 31, and the fluid pressure in the wheel cylinder WCfl is reduced to weaken the brake torque applied to the left front wheel Wfl, whereby the braking slip amount of the left front wheel Wfl is decreased.

As described above, the controller 60 switches each of the retention valve 22 and the reducing valve 31 between two positions and drives the pump 26 by the electric motor 26a in dependence on the braking slip amount of the left front wheel Wfl, whereby the fluid pressure in the wheel cylinder WCfl is regulated to be switched between pressure decrease, re-increase and retention. By the regulation of the fluid pressure in the wheel cylinder WCfl, the braking slip amount of the left front wheel Wfl can be prevented from becoming excess during the braking operation of the vehicle.

Further, that the braking slip amount of the right rear wheel Wrr becomes excess during the braking operation can be avoided wherein the fluid pressure in the wheel cylinder WCrr is regulated to be switched between pressure decrease, re-increase and retention as a result that the controller 60 switches each of the reducing valve 32 and the retention valve 23 between two positions and drives the pump 26 by the electric motor 26a in dependence on the braking slip amount of the right rear wheel Wrr during the braking operation.

Further, that the braking slip amount of the right front wheel Wfr becomes excess during the braking operation can be avoided wherein the fluid pressure in the wheel cylinder WCfr is regulated to be switched between pressure decrease, re-increase and retention as a result that the controller 60 switches each of the reducing valve 51 and the retention valve 42 between two positions and drives the pump 46 by the electric motor 26a in dependence on the braking slip amount of the right front wheel Wfr during the braking operation.

Further, that the braking slip amount of the left rear wheel Wrl becomes excess during the braking operation can be avoided wherein the fluid pressure in the wheel cylinder WCrl is regulated to be switched between pressure decrease, re-increase and retention as a result that the controller 60 switches each of the retention valve 43 and the reducing valve 52 between two positions and drives the pump 46 by the electric motor 26a in dependence on the braking slip amount of the left rear wheel Wrl during the braking operation.

Next, description will be made regarding a traction control for preventing a driving slip amount of each driving wheel from becoming excess at the time of each of the starting and acceleration of the vehicle. Herein, the driving slip amount is the amount of a slip occurring due to a quick increase in driving force of each driving wheel at the time of starting or acceleration. The vehicle brake hydraulic pressure control device A shown in FIG. 1 is applied to a front-wheel drive vehicle. At the time of each of starting and acceleration, usually the brake pedal 11 is not being manipulated, the respective electromagnetic valves of the actuator B are at the usual-state positions shown in FIG. 1, and the electric motor 26a is out of operation. For example, when the driving slip amount of the left front wheel Wfl of the vehicle is likely to become excess, the controller 60 switches the cutoff valve 21 from the completely open position to the completely closed position, also switches the replenishing valve 33 from the closed position to the open position and starts the electric motor 26a to drive the pumps 26, 46. Thus, the pump 26 draws the brake fluid in the reservoir tank 12 from the suction port through the master cylinder 10 and the replenishing valve 33 and pressurizes and discharges the brake fluid from the discharge port. The brake fluid discharged from the pump 26 is supplied to the wheel cylinder WCfl through the check valve 25, the damper device 24 and the retention valve 22. As a result, the fluid pressure in the wheel cylinder WCfl rises and applies a brake torque to the left front wheel Wfl to suppress an increase in the wheel speed of the left front wheel Wfl, so that the increase in the driving slip amount of the left front wheel Wfl can be precisely suppressed. Then, the controller 60 controls the cutoff valve 21 to the open position and also controls the opening degree of the cutoff valve 21 to regulate the fluid pressure in the wheel cylinder WCfl, so that the driving slip amount of the left front wheel Wfl can be precisely controlled to become a suitable driving slip amount.

Further, when the driving slip amount of the right front wheel Wfr of the vehicle is likely to become excess, the controller 60 switches the cutoff valve 41 from the completely open position to the completely closed position, also switches the replenishing valve 53 from the closed position to the open position and starts the electric motor 26a to drive the pumps 46, 26. Thus, the pump 46 draws the brake fluid in the reservoir tank 12 from the suction port through the master cylinder 10 and the replenishing valve 53 and pressurizes and discharges the brake fluid from the discharge port. The brake fluid discharged from the pump 46 is supplied to the wheel cylinder WCfr through the check valve 45, the damper device 44 and the retention valve 42. As a result, the fluid pressure in the wheel cylinder WCfr rises and applies a brake torque to the right front wheel Wfr to suppress an increase in the wheel speed of the right front wheel Wfr, so that the increase in the driving slip amount of the right front wheel Wfr can be precisely suppressed. Then, the controller 60 controls the cutoff valve 41 to the open position and also controls the opening degree of the cutoff valve 41 to regulate the fluid pressure in the wheel cylinder WCfr, so that the driving slip amount of the right front wheel Wfr can be precisely controlled to become a suitable driving slip amount.

Next, the operation of the check valve 25 will be described with reference to FIGS. 2 to 4. The pump 26 is brought into operation at the time of each of the ABS control, the traction control and the like, and the pump 26 draws, pressurizes and discharges the brake fluid. The brake fluid discharged from the pump 26 flows into the inflow port 34a of the check valve 25 arranged on the downstream side of the pump 26. The brake fluid flown into the inflow port 34a presses the spherical valve body 35 in the downstream direction by a force corresponding to the brake fluid pressure. At this time, as mentioned earlier, the spherical valve body 35 is pressed against the valve seat 38 by being urged roughly in the upstream direction by the action of the tongue piece portion 36b of the plate spring 36 arranged on the downstream side as it is urged with a little inclination toward the base end 36c of the tongue piece portion 36b (refer to FIG. 2). Then, when the force by which the brake fluid presses the spherical valve body 35 in the downstream direction exceeds the force by which the plate spring 36 urges the spherical valve body 35 in the upstream direction, the spherical valve body 35 leaves the valves seat 38 to start the valve opening operation.

Thereafter, with an increase in the discharge pressure of the pump 26, the spherical valve body 35 further leaves the valves seat 38 to increase the quantity of fluid passing through the check valve 25 (i.e., through the two fluid-pass openings 36p shown in FIG. 4). Even after the increase of the flow quantity, the spherical valve body 35 is urged by the plate spring 36 in the direction toward the base end 36c of the tongue piece portion 36b always with the inclination at a small angle relative to the flow direction of the brake fluid, as mentioned earlier, and therefore, is held pushed against at least one of the valve seat 38 and the circumferential wall 34b of the valve chamber 37. In this manner, the spherical valve body 35 is stably held by the tongue piece portion 36b of the plate spring 36 and at least one of the valve seat 38 and the circumferential wall 34b of the valve chamber 37. Accordingly, it does not occur that the spherical valve body 35 vibrates by being influenced to resonate with the pulsation in the pump discharge pressure. Neither does it that the vibrating spherical valve body 35 hits the circumferential wall 34b or the valve seat 38 to generate strange sounds.

When a large volume of brake fluid passes through the two fluid-pass openings 36p, as shown in FIG. 3, the spherical valve body 35 is further moved toward the downstream side as it pushes the tongue piece portion 36b of the plate spring 36. However, the stop portion 36h which is formed on the upstream-side end surface around the inner edge 36f on the radial other side of the fixed portion 36 stops the tongue piece portion 36b from being further moved or flexed across the stop portion 36h on the radial other side of the fixed portion 36a in the downstream direction. Also in this state, the tongue piece portion 36b remains inclined at another predetermined small angle (smaller than that shown in FIG. 2) toward the valve seat 38 side. Thus, the spherical valve body 35 is stably held by being pressed by the tongue piece portion 36b against the circumferential wall 34b of the valve chamber 37 on the radial one side. Accordingly, it does not occur that the spherical valve body 35 vibrates by being influenced to resonate with the pulsation in the pump discharge pressure and hits the circumferential wall 34b to generate strange sounds. Further, because the stop portion 36h is formed around the inner edge 36f on the radial other side of the fixed portion 36a, it does not occur that the tongue piece portion 36b is broken by being strained over an allowable stress thereof.

As apparent from the foregoing description, in the first embodiment, the plate spring 36 as resilient member is greatly shortened in the flow direction of fluid because of being composed of the annular fixed portion 36a and the tongue piece portion 36b formed to be connected to (i.e., to extend from) the fixed portion 36a. Further, because the end 36d of the tongue piece portion 36b is formed to extend beyond the inner edge 36f on the radial other side of the annular fixed portion 36a, the tongue piece portion 36b cannot be moved across the fixed portion 36a from the valve chamber 37 side. For the reasons that the end 36d of the tongue piece portion 36b is prevented from being moved or flexed across the fixed portion 36a in the direction away from the valve seat 38 and that the tongue piece portion 36b is always held in the state that it is inclined relative to the flow direction of fluid, the spherical valve body 35 urged by the tongue piece portion 36b is stably held by being urged to be deflected in one direction inclined relative to the axial direction of the valve chamber 37 when leaving the valve seat 38 to be balanced by the pressure of the brake fluid. Accordingly, it does not occur that the spherical valve body 35 vibrates by being influenced by the pulsation in the pump discharge pressure and hits the circumferential wall 34b or the valve seat 38 to generate strange sounds. Further, because the tongue piece portion 36b cannot be moved across the inner edge 36f on the radial other side of the fixed portion 36a in the direction away from the valve seat 38, it does not occur that the tongue piece portion 36b is broken by being strained over the allowable stress thereof.

Further, in the foregoing first embodiment, because the tongue piece portion 36b of the plate spring 36 is formed by rolling to extend the end thereof beyond the inner edge 36f on the radial other side of the fixed portion 36a, it is possible to form the plate spring 36 from a one-piece blank. This one-piece blank can be manufactured in a simple method such as punching, blanking or the like and therefore, is suitable for a low cost.

Further, in the foregoing first embodiment, because the rolled portion 36d is provided at the end (i.e., extreme or free end) of the tongue piece portion 36b, the rolling can be performed easily with a small force, and it is easy to control the dimension (i.e., the length in the radial direction) of the end which is extend by rolling.

Moreover, in the foregoing first embodiment, since the check valves 25, 45 downsized according to the present invention are arranged in the brake hydraulic pressure control device A, it becomes possible to make the whole of the brake hydraulic pressure control device A downsized and light in weight. In addition, since the check valves 25, 45 do not become the sources of vibration, it does not occur that such vibration is transmitted to the driver stepping the brake pedal 11 to adversely affect the brake feeling or to adversely affect the control of the brake hydraulic pressure, so that the stability of the brake hydraulic pressure control device A can be ensured.

(Second Embodiment)

Next, a check valve in a second embodiment according to the present invention will be described with reference to FIG. 6. The check valve in the second embodiment differs only in the structure of a plate spring 56 from the check valve 25 in the foregoing first embodiment. Thus, the following description is directed to the difference, and description regarding other respects is omitted for the sake of brevity. The same components in the second embodiment as those in the first embodiment are designated by the same reference numerals.

Figure 6:
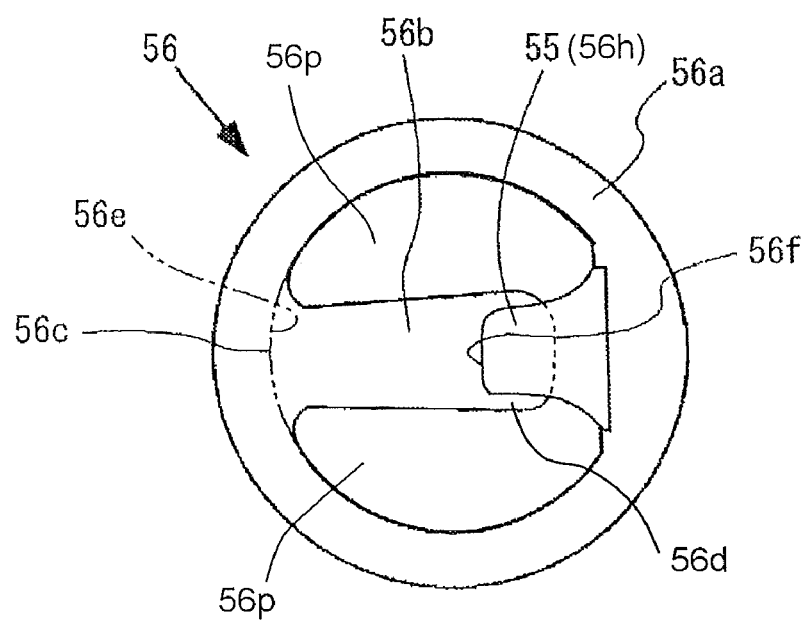
FIG. 6 is a plan view of a plate spring incorporated in a check valve in a second embodiment.

As shown in FIG. 6, a tongue piece portion 56b of the plate spring 56 in the second embodiment is formed so that it is connected at a base end 56c thereof to an inner edge 56e on a radial one side (in other words, the tongue piece portion 56b bodily extends from a part on the radial one side of an annular fixed portion 56a) and is bent or deflected from a fulcrum adjacent to the base end 56c at a predetermined angle to deflect off a fixed portion 56a toward the valve seat 38 side in the axial or longitudinal direction. Two fluid-pass openings 56p each taking a generally crescent shape with the same pass area are defined by lengthwise side edges of the tongue piece portion 56b and the inner edge of the annular fixed portion 56a for allowing the working fluid to flow across the plate spring 56.

Further, a portion adjacent to an inner edge 56f on a radial other side of the fixed portion 56a is extended by rolling toward the tongue piece portion 56b (i.e., radially inward) to form a rolled portion 55. The tongue piece portion 56b is formed to extend an unrolled end (i.e., extreme or free end) 56d thereof beyond the inner edge 56f of the rolled portion 55 on the radial other side. Thus, the upstream-side surface of the rolled portion 55 which surface faces the end of the tongue piece portion 56b acts as a stop portion 56h for preventing the tongue piece portion 56b from being flexed across the rolled portion 55 in the flow direction of the brake fluid. With this construction, it does not take place that the tongue piece portion 56b would otherwise be deformed and strained if a rolling were carried out on a part of the tongue piece portion 56b, and the same effects as those in the foregoing first embodiment can be realized.

Rolling a part of the tongue piece portion 36b (the first embodiment) or the fixed portion 56a (the second embodiment) is deemed to be optimum in terms of simplifying the manufacturing steps. However, the present invention is not limited to so doing, and instead, the tongue piece portion 36b or the inner edge 36f on the radial other side of the fixed portion 36a may be extended radially of the plate spring 36 by having another member joined thereto (e.g., by welding or the like).

Although the foregoing first and second embodiments show the examples that the check valves according to the present invention are applied to be used on the, discharge sides of the pumps 26, 46 of the brake hydraulic pressure control device A, the check valve according to the present invention is applicable for a pump incorporated in any other device than the brake hydraulic pressure control device A.

Further, the check valve according to the present invention is not limited to be used only on a discharge side of a pump. Instead, it may be used in a piping system in which fluid flows, and is especially suitable as a check valve used in a piping system that is large in pressure pulsation of fluid.

Various features and many of the attendant advantages in the foregoing embodiments and the modified form thereof will be summarized as follows:

In the check valve 25 in the foregoing first and second embodiments and the modified form shown in FIGS. 2-4, 6 and 7, since the resilient member 36, 56 is formed to take a plate-like shape extending across the valve chamber 37 and is provided with the annular fixed portion 36a, 56a and the tongue piece portion 36b, 56b extending radially from the annular fixed portion 36a, 56a, the check valve 25 can substantially be shortened in the direction of fluid flow. Further, since the tongue piece portion 36b, 56b is formed to extend the end 36d, 56d thereof beyond the inner edge 36f, 56f on the radial other side of the annular fixed portion 36a, 56a, the tongue piece portion 36b, 56b cannot move across the annular fixed portion 36a, 56a from the valve chamber 37 side. The end 36d, 56d of the tongue piece portion 36b, 56b is prevented from being moved or flexed across the annular fixed portion 36a, 56a in the direction away from the valve seat 38, and the tongue piece portion 36b, 56b is held in the state that it is always inclined relative to the direction of fluid flow. Thus, when leaving from the valve seat 38 and being balanced by the pressure of the working fluid, the spherical valve body 35 urged by the tongue piece portion 36b, 56b is deflected in one direction inclined relative to the axial direction of the valve chamber 37 and therefore, can be held stably. Accordingly, it does not occur that the spherical valve body 35 vibrates by being influenced by the pulsation in the working fluid, and nor does it that the spherical valve body 35 hits the circumferential wall 34b of the valve chamber 37 or the valve seat 38 to generate strange sounds. Further, since the tongue piece portion 36b, 56b cannot move across the inner edge 36f, 56f on the radial other side of the annular fixed portion 36a, 56a in the direction away from the valve seat 38, it does also not occur that the tongue piece portion 36b, 56b is broken as a result of being strained over an allowable stress thereof.

Also in the check valve 25 in the foregoing embodiments and the modified form shown in FIGS. 2-4, 6 and 7, since the tongue piece portion 36b, 56b remains inclined toward the valve seat 38 side by a predetermined angle when in contact at the end 36d, 56d thereof with the stop portion 36h, 56h provided around at the inner edge 36f, 56f on the radial other side of the annular fixed portion 36a, 56a, it is ensured that the spherical valve body 35 is held in contact with a portion on the radial one side of at least one of the valve seat 38 and the circumferential wall 34b of the valve chamber 37 while leaving the valve seat 38.

In the check valve 25 in the foregoing first embodiment and the modified form shown in FIGS. 2-4 and 7, since the tongue piece portion 36b is rolled to extend the end 36d thereof beyond the inner edge 36f on the radial other side of the annular fixed portion 36a, the plate-like resilient member 36 can be made of a piece of blank. The piece of blank can be manufactured easily in a simplified method such as punching, blanking or the like, the resilient member 36 and hence, the check valve 25 incorporating the same can be reduced in cost.

In the check valve 25 in the foregoing first embodiment shown in FIGS. 2-4, since the rolled portion 36d is provided at the end of the tongue piece portion 36b, it is possible to extend the end by a small rolling force, so that the length of the tongue piece portion 36b having the rolled portion 36a at the end thereof can be controlled easily.

In the check valve 25 in the modified shown in FIG. 7 of the first embodiment, the rolled portion 36g is provided at the center part of the tongue piece portion 36b. Therefore, it is possible to extend the rolled portion 36g of the tongue piece portion 36b by a small rolling force. In addition, there can easily be avoided a possibility that at the time of a rolling machining, a rolling tool which is brought into rolling contact with the center part of the tongue piece portion 36b interferes with the inner edge 36f on the radial other side of the annular fixed portion 36a beyond which edge the end of the tongue piece portion 36b is extended, and therefore, it becomes easy to form the center part of the tongue piece portion 36b as the rolled portion 36g.

In the check valve 25 in the foregoing second embodiment shown in FIG. 6, since the rolled portion 55 is provided around at the inner edge 56f on the radial other side of the annular fixed portion 56a, it does not occur that the tongue piece portion 56b would otherwise be deformed and strained if were extended by rolling at a part thereof.

In the brake hydraulic pressure control device A in the embodiment shown in FIG. 1, since the check valve 25 downsized in any one of the first and second embodiments and the modified form thereof shown in FIGS. 2-4, 6 and 7 is incorporated therein, the brake hydraulic pressure control device A can be downsized and reduced in weight as a whole. In addition, since the check valve 25 does not become a source of vibration, it does not occur that such vibration is transmitted to the driver stepping the brake pedal 11 to adversely affect the brake feeling or to adversely affect the control of the brake hydraulic pressure, so that the stability of the brake hydraulic pressure control device A can be ensured.

Obviously, numerous other modifications and variations of the present invention are possible in light of the above teachings. It is therefore to be understood that within the scope of the appended claims, the present invention may be practiced otherwise than as specifically described herein.

What is claimed is:

1. A check valve comprising:
a main body with a valve chamber formed therein between inflow and outflow ports thereof;
a spherical valve body received in the valve chamber;
a valve seat for blocking the flow of working fluid from the valve chamber toward the inflow port when the spherical valve body is seated on the valve seat;
and a resilient member arranged across the valve chamber and urging the spherical valve body to be seated on the valve seat, the resilient member including:
an annular fixed portion fixed on a circumferential wall of the valve chamber; and
a tongue piece portion extending from an inner edge on a radial one side of the annular fixed portion across the valve chamber to extend an end thereof beyond an inner edge on a radial other side of the annular fixed portion, the tongue piece portion being formed to be deflected from the annular fixed portion toward a valve seat side and being resiliently contacted with the spherical valve body at a center part thereof for disengageably pressing the spherical valve body against the valve seat.

2. The check valve as set forth in claim 1, wherein:
the inner edge on the radial other side of the annular fixed portion is provided with a stop portion for stopping upon contact the end of the tongue piece portion which is pushed by the spherical valve body leaving the valve seat; and
the tongue piece portion in contact with the stop portion is inclined toward the valve seat side by a predetermined angle.

3. The check valve as set forth in claim 1, wherein:
the resilient member has the annular fixed portion and the tongue piece portion formed integrally; and
the tongue piece portion is provided thereon with a rolled portion which is rolled to extend the end of the tongue piece portion beyond the inner edge on the radial other side of the fixed portion.

4. The check valve as set forth in claim 3, wherein the rolled portion is provided at the end of the tongue piece portion.

5. The check valve as set forth in claim 3, wherein the rolled portion is provided at the center part of the tongue piece portion.

6. The check valve as set forth in claim 1, wherein:
the resilient member has the annular fixed portion and the tongue piece portion formed integrally; and
the annular fixed portion is provided at the inner edge on the radial other side thereof with a rolled portion which is rolled to extend radially inward beyond the end of the tongue piece portion.

7. A brake hydraulic pressure control device provided with a check valve for allowing the flow of working fluid in one direction but blocking the flow of working fluid in the other direction and being capable of controlling the fluid pressure of the working fluid supplied to a wheel cylinder, wherein:
the check valve is constructed as described in claim 1.

8. A brake hydraulic pressure control device provided with a check valve for allowing the flow of working fluid in one direction but blocking the flow of working fluid in the other direction and being capable of controlling the fluid pressure of the working fluid supplied to a wheel cylinder, wherein:
the check valve is constructed as described in claim 2.

9. A brake hydraulic pressure control device provided with a check valve for allowing the flow of working fluid in one direction but blocking the flow of working fluid in the other direction and being capable of controlling the fluid pressure of the working fluid supplied to a wheel cylinder, wherein:
the check valve is constructed as described in claim 3.

10. A brake hydraulic pressure control device provided with a check valve for allowing the flow of working fluid in one direction but blocking the flow of working fluid in the other direction and being capable of controlling the fluid pressure of the working fluid supplied to a wheel cylinder, wherein:
the check valve is constructed as described in claim 6.

* * * * *